(12) United States Patent
Klawer et al.

(10) Patent No.: US 12,060,929 B2
(45) Date of Patent: *Aug. 13, 2024

(54) CHAINRING

(71) Applicant: Fox Factory, Inc., Duluth, GA (US)

(72) Inventors: Paul Klawer, North Vancouver (CA); Wesley E. Allinger, Santa Cruz, CA (US); Jason Kennett, North Vancouver (CA)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,333

(22) Filed: Jun. 13, 2022

(65) Prior Publication Data

US 2023/0015350 A1    Jan. 19, 2023

Related U.S. Application Data

(63) Continuation of application No. 16/708,061, filed on Dec. 9, 2019, now Pat. No. 11,359,709.

(60) Provisional application No. 62/781,536, filed on Dec. 18, 2018.

(51) Int. Cl.
| | |
|---|---|
| *F16H 55/30* | (2006.01) |
| *B62M 9/10* | (2006.01) |
| *F16G 13/06* | (2006.01) |
| *F16H 55/08* | (2006.01) |

(52) U.S. Cl.
CPC ............. *F16H 55/30* (2013.01); *B62M 9/105* (2013.01); *F16G 13/06* (2013.01); *F16H 55/08* (2013.01)

(58) Field of Classification Search
CPC .............. F16H 55/30; F16H 57/0006; F16H 2055/306; B62M 9/105; B62M 9/10

USPC ........................................................ 474/156
See application file for complete search history.

(56) References Cited

U.S. PATENT DOCUMENTS

| | | | |
|---|---|---|---|
| 588,577 A * | 8/1897 | Humphreys | ............ F16H 55/30 474/156 |
| 2,451,690 A | 10/1948 | Oehler | |
| 2,468,011 A | 4/1949 | Hazel | |
| 2,793,571 A | 5/1957 | Way et al. | |
| 3,168,836 A | 2/1965 | Militana | |
| 3,200,665 A | 8/1965 | Martin | |
| 3,272,027 A | 9/1966 | Wayman | |
| 3,304,796 A | 2/1967 | Leege | |
| 3,371,549 A | 3/1968 | Ernst | |

(Continued)

FOREIGN PATENT DOCUMENTS

| | | |
|---|---|---|
| CA | 2964058 A1 | 10/2017 |
| CN | 1830722 A | 9/2006 |

(Continued)

OTHER PUBLICATIONS

Chinese First Action and Search Report, App No. 201710232829.8, 12 Pages, Dated Feb. 3, 2020.

(Continued)

*Primary Examiner* — Henry Y Liu

(57) ABSTRACT

A chainring is disclosed. The chainring includes a plurality of teeth about the outer perimeter of the chainring; and a chain retention feature at a root of one or more of the plurality of teeth and traversing at least a portion of a circumference of the chainring, the chain retention feature to align with at least a portion of a roller chain and assist in a retention of the roller chain on the chainring.

9 Claims, 5 Drawing Sheets

(56) References Cited

U.S. PATENT DOCUMENTS

| | | | |
|---|---|---|---|
| 3,815,439 A | 6/1974 | Tarutani | |
| 3,903,754 A | 9/1975 | Morroni | |
| 3,905,248 A | 9/1975 | Peyrard | |
| 3,987,539 A | 10/1976 | Gravener | |
| 4,144,773 A | 3/1979 | Addicks | |
| 4,174,642 A * | 11/1979 | Martin | F16H 55/30 474/152 |
| 4,240,303 A * | 12/1980 | Mosley | F16H 57/04 474/151 |
| 4,261,214 A * | 4/1981 | Watanabe | B62M 9/00 474/151 |
| RE30,758 E | 10/1981 | Lang | |
| 4,318,310 A | 3/1982 | Segawa | |
| 4,331,043 A | 5/1982 | Shimano | |
| 4,358,967 A | 11/1982 | Kastan | |
| 4,392,841 A * | 7/1983 | Juy | B62M 9/10 474/82 |
| 4,439,172 A | 3/1984 | Segawa | |
| 4,446,753 A | 5/1984 | Nagano | |
| 4,453,924 A | 6/1984 | Sugino | |
| 4,475,894 A | 10/1984 | Sugino | |
| 4,545,691 A | 10/1985 | Kastan et al. | |
| 4,583,422 A | 4/1986 | Boyd | |
| 4,586,914 A | 5/1986 | Nagano | |
| 4,594,910 A | 6/1986 | Nagano | |
| 4,598,608 A | 7/1986 | Ueno | |
| 4,608,878 A | 9/1986 | Shimano | |
| 4,722,722 A | 2/1988 | Rampe | |
| 4,867,733 A * | 9/1989 | Yamanoi | F16H 7/06 474/161 |
| 4,889,521 A | 12/1989 | Nagano | |
| 5,003,840 A | 4/1991 | Hinschlager | |
| 5,192,248 A | 3/1993 | Nagano | |
| 5,192,249 A * | 3/1993 | Nagano | B62M 9/10 474/160 |
| 5,224,903 A * | 7/1993 | Langhof | B62M 9/08 474/152 |
| 5,226,469 A | 7/1993 | Matsumura et al. | |
| 5,246,402 A | 9/1993 | Romano | |
| 5,285,701 A | 2/1994 | Parachinni | |
| 5,362,278 A * | 11/1994 | Bergles | F16G 13/04 474/69 |
| 5,413,534 A | 5/1995 | Nagano | |
| 5,451,198 A | 9/1995 | Lancaster | |
| 5,738,603 A | 4/1998 | Schmidt et al. | |
| 5,830,096 A | 11/1998 | Schmidt et al. | |
| 5,852,954 A | 12/1998 | Yamanaka | |
| 5,908,364 A * | 6/1999 | Tanaka | F16H 7/06 474/202 |
| 5,935,033 A | 8/1999 | Tseng et al. | |
| 5,947,852 A | 9/1999 | Moretz | |
| 5,984,817 A * | 11/1999 | Schulz | F16H 55/30 474/160 |
| 6,007,442 A * | 12/1999 | Schmidt | B62M 9/10 474/122 |
| 6,013,001 A | 1/2000 | Miyoshi | |
| 6,022,284 A | 2/2000 | Bartolozzi et al. | |
| 6,102,821 A | 8/2000 | Nakamura | |
| 6,202,506 B1 | 3/2001 | Storck et al. | |
| 6,203,462 B1 * | 3/2001 | Takamori | F16H 7/06 474/160 |
| 6,564,675 B1 | 5/2003 | Jiang | |
| 6,572,500 B2 | 6/2003 | Tetsuka | |
| 6,656,072 B2 * | 12/2003 | Sugita | B62M 7/02 474/160 |
| 6,666,786 B2 | 12/2003 | Yahata | |
| 6,755,095 B2 | 6/2004 | Yamanaka | |
| 6,860,171 B1 | 3/2005 | Nanko et al. | |
| 7,080,574 B2 | 7/2006 | Chang | |
| 7,263,914 B2 | 9/2007 | Ording et al. | |
| 7,267,030 B2 | 9/2007 | French | |
| 7,462,120 B1 | 12/2008 | Thompson | |
| 7,503,864 B2 | 3/2009 | Nonoshita et al. | |
| 7,530,290 B2 | 5/2009 | Lin | |
| 7,610,832 B2 | 11/2009 | Guiseppe et al. | |
| 7,686,721 B2 | 3/2010 | Tabe et al. | |
| 7,699,733 B2 | 4/2010 | Sakura et al. | |
| 7,713,156 B2 | 5/2010 | Sakura et al. | |
| 7,753,815 B2 | 7/2010 | Saifuddin et al. | |
| 7,824,287 B2 | 11/2010 | Nonoshita et al. | |
| 7,850,564 B2 | 12/2010 | Nonoshita | |
| 7,883,437 B2 | 2/2011 | Braedt | |
| 7,942,771 B2 | 5/2011 | Kamada | |
| 7,967,709 B2 | 6/2011 | Emura et al. | |
| 8,025,304 B2 | 9/2011 | Smith | |
| 8,057,338 B2 | 11/2011 | Kamada | |
| 8,070,632 B2 | 12/2011 | Yuan | |
| 8,096,908 B2 | 1/2012 | Oishi et al. | |
| 8,226,511 B2 * | 7/2012 | Kamada | B62M 9/10 474/160 |
| 8,298,104 B2 * | 10/2012 | Sakura | F01L 1/022 474/213 |
| 8,479,610 B2 | 7/2013 | Valle et al. | |
| 8,550,944 B2 * | 10/2013 | Esquibel | B62M 9/10 474/160 |
| 8,573,093 B2 | 11/2013 | Valle et al. | |
| 8,616,084 B2 | 12/2013 | Meggiolan | |
| 8,820,192 B2 | 9/2014 | Staples et al. | |
| 8,882,619 B2 * | 11/2014 | Braedt | B62M 9/10 474/156 |
| 8,888,631 B2 * | 11/2014 | Morita | F16H 55/30 474/155 |
| 9,016,169 B2 * | 4/2015 | Sugimoto | B62M 9/105 74/594.2 |
| 9,033,835 B2 * | 5/2015 | Blank | B62M 9/10 474/152 |
| 9,302,733 B2 | 4/2016 | Schlanger | |
| 9,302,736 B2 | 4/2016 | Iwai et al. | |
| 9,308,967 B2 * | 4/2016 | Braedt | B62M 9/10 |
| 9,328,814 B2 * | 5/2016 | Wesling | B62M 9/10 |
| 9,415,835 B2 | 8/2016 | Tokuyama et al. | |
| 9,440,706 B2 * | 9/2016 | Iwai | B62M 9/105 |
| 9,463,844 B2 * | 10/2016 | Fukunaga | B62M 9/10 |
| 9,493,211 B2 * | 11/2016 | Reiter | F16H 55/30 |
| 9,540,070 B2 * | 1/2017 | Watarai | F16H 55/30 |
| 9,580,144 B2 * | 2/2017 | Bernardele | B62M 9/10 |
| 9,631,714 B2 * | 4/2017 | Watarai | B62M 9/12 |
| 9,677,658 B2 * | 6/2017 | Wickliffe | F16H 55/30 |
| 9,719,590 B2 * | 8/2017 | Reiter | B62M 9/10 |
| 9,725,133 B2 * | 8/2017 | Staples | B62K 19/16 |
| 9,791,033 B2 * | 10/2017 | Wickliffe | B62M 9/105 |
| 9,869,382 B2 * | 1/2018 | Wesling | F16H 55/30 |
| 9,914,502 B2 | 3/2018 | Wu | |
| 9,919,763 B2 | 3/2018 | Iwai et al. | |
| 9,926,038 B2 * | 3/2018 | Fukunaga | B62M 9/10 |
| 9,932,090 B2 * | 4/2018 | Yoshida | B62M 9/12 |
| 9,944,351 B2 * | 4/2018 | Braun | B62M 9/131 |
| 9,963,196 B2 * | 5/2018 | Sugimoto | F16H 55/303 |
| 9,994,285 B2 * | 6/2018 | Tokuyama | F16H 55/30 |
| 10,040,510 B2 * | 8/2018 | Sugimoto | F16H 55/30 |
| 10,053,186 B2 * | 8/2018 | Braedt | B25B 27/0071 |
| 10,059,400 B2 * | 8/2018 | Tokuyama | B62M 9/10 |
| 10,155,566 B2 * | 12/2018 | Sugimoto | B62M 9/105 |
| 10,221,887 B2 | 3/2019 | Dubois et al. | |
| 10,358,186 B2 * | 7/2019 | Sugimoto | B62M 9/105 |
| 10,359,106 B2 * | 7/2019 | Akanishi | B62M 9/10 |
| 10,359,107 B2 * | 7/2019 | Young | F16H 55/30 |
| 10,377,445 B2 | 8/2019 | Hirose et al. | |
| 10,407,127 B2 * | 9/2019 | Sugimoto | F16H 55/30 |
| 10,443,685 B2 * | 10/2019 | Reiter | F16G 13/06 |
| 10,507,888 B2 | 12/2019 | Sugimoto | |
| 10,550,925 B2 * | 2/2020 | Akanishi | B62M 9/00 |
| 10,562,589 B2 | 2/2020 | Sugimoto et al. | |
| 10,578,201 B2 * | 3/2020 | Reiter | B62M 1/36 |
| 10,800,482 B2 | 10/2020 | Staples et al. | |
| 10,864,963 B2 | 12/2020 | Staples et al. | |
| 10,994,804 B2 * | 5/2021 | Sugimoto | B62M 9/02 |
| 11,014,628 B2 | 5/2021 | Choltco-Devlin et al. | |
| 11,130,546 B2 | 9/2021 | Staples et al. | |
| 11,505,277 B1 | 11/2022 | Yamanaka | |
| 2002/0086753 A1 * | 7/2002 | Yahata | B62M 9/105 474/160 |

(56) References Cited

U.S. PATENT DOCUMENTS

| | | |
|---|---|---|
| 2003/0097900 A1 | 5/2003 | Yamanaka |
| 2003/0199351 A1 | 10/2003 | Nichols |
| 2004/0070166 A1 | 4/2004 | Valle |
| 2004/0092352 A1 | 5/2004 | Chiang |
| 2004/0200314 A1 | 10/2004 | Hermansen et al. |
| 2004/0204274 A1* | 10/2004 | Young ................ F16H 7/06 474/100 |
| 2005/0009656 A1 | 1/2005 | Preis et al. |
| 2005/0014590 A1* | 1/2005 | Wen .................. B62M 9/00 474/160 |
| 2005/0032596 A1* | 2/2005 | Nonoshita .......... B62K 19/16 474/178 |
| 2005/0039570 A1 | 2/2005 | Nanko et al. |
| 2005/0072264 A1 | 4/2005 | Yamanaka |
| 2005/0081678 A1 | 4/2005 | Smith |
| 2005/0090349 A1 | 4/2005 | Lee |
| 2005/0199092 A1 | 9/2005 | Feltrin et al. |
| 2005/0233850 A1 | 10/2005 | Andel |
| 2005/0282671 A1* | 12/2005 | Emura ................ B62M 9/105 474/160 |
| 2005/0282672 A1* | 12/2005 | Nonoshita .......... B62M 9/105 474/174 |
| 2006/0205549 A1 | 9/2006 | Nonoshita et al. |
| 2006/0210734 A1 | 9/2006 | Lin |
| 2006/0288819 A1 | 12/2006 | Dal et al. |
| 2007/0034043 A1 | 2/2007 | Feltrin |
| 2007/0049437 A1* | 3/2007 | Wickliffe ............ B62M 9/10 474/152 |
| 2007/0054768 A1* | 3/2007 | Miyazawa .......... F16H 55/30 474/152 |
| 2007/0111833 A1* | 5/2007 | Young ................ F16H 7/06 474/100 |
| 2007/0129193 A1 | 6/2007 | Nonoshita et al. |
| 2007/0137425 A1 | 6/2007 | Dal et al. |
| 2007/0173364 A1 | 7/2007 | Renshaw |
| 2007/0186718 A1 | 8/2007 | Chiang |
| 2007/0199403 A1 | 8/2007 | Ciavatta et al. |
| 2007/0227293 A1 | 10/2007 | Valle |
| 2007/0227294 A1 | 10/2007 | Valle |
| 2007/0265122 A1* | 11/2007 | Emura ................ B62M 9/105 474/152 |
| 2007/0270261 A1* | 11/2007 | Sakura ............... F16H 55/30 474/152 |
| 2007/0283781 A1 | 12/2007 | Meggiolan |
| 2008/0028887 A1 | 2/2008 | Valle et al. |
| 2008/0120845 A1 | 5/2008 | Hama |
| 2008/0176691 A1 | 7/2008 | Saifuddin et al. |
| 2008/0202284 A1 | 8/2008 | Valle et al. |
| 2008/0207369 A1 | 8/2008 | Bouchez |
| 2008/0272572 A1 | 11/2008 | Tsai |
| 2008/0314193 A1 | 12/2008 | Meggiolan |
| 2009/0042681 A1 | 2/2009 | Dal et al. |
| 2009/0042682 A1 | 2/2009 | Dal et al. |
| 2009/0105024 A1* | 4/2009 | Sakura ............... F16G 13/06 474/156 |
| 2009/0236777 A1 | 9/2009 | Chiang |
| 2009/0243160 A1 | 10/2009 | Chiang |
| 2009/0247337 A1* | 10/2009 | Sakura ............... F16H 7/06 474/156 |
| 2010/0064845 A1 | 3/2010 | French |
| 2010/0093494 A1 | 4/2010 | Smith |
| 2010/0326233 A1 | 12/2010 | Schlanger |
| 2011/0126666 A1 | 6/2011 | McAinsh |
| 2011/0167943 A1 | 7/2011 | Lermen et al. |
| 2011/0251008 A1 | 10/2011 | Schmitz et al. |
| 2011/0319209 A1 | 12/2011 | Huang et al. |
| 2012/0172165 A1 | 7/2012 | Schroedl |
| 2013/0011215 A1* | 1/2013 | Wells ................. F16B 23/0007 411/548 |
| 2013/0087013 A1* | 4/2013 | Sugimoto ........... B62M 9/105 74/594.2 |
| 2013/0139642 A1* | 6/2013 | Reiter ................ B62M 9/08 74/594.2 |
| 2013/0184110 A1* | 7/2013 | Reiter ................ F16H 55/30 474/152 |
| 2014/0335987 A1 | 11/2014 | Iwai et al. |
| 2015/0082939 A1* | 3/2015 | Meyer ................ B62M 3/00 74/594.2 |
| 2015/0152231 A1* | 6/2015 | Ohki .................. C08J 5/04 524/496 |
| 2015/0175241 A1 | 6/2015 | Malloy |
| 2015/0176692 A1* | 6/2015 | Roh .................. F16H 7/06 474/156 |
| 2015/0198231 A1* | 7/2015 | Emura ................ F16H 7/06 474/156 |
| 2015/0210352 A1* | 7/2015 | Sugimoto ........... B62M 9/105 474/80 |
| 2015/0210353 A1* | 7/2015 | Tokuyama .......... B62M 9/12 474/160 |
| 2015/0211623 A1* | 7/2015 | Inui .................. B23K 15/04 219/121.64 |
| 2015/0217834 A1* | 8/2015 | Iwai .................. B62M 9/105 474/152 |
| 2015/0337943 A1* | 11/2015 | Sugimoto ........... F16H 55/30 474/152 |
| 2015/0360749 A1* | 12/2015 | Iwai .................. F16H 55/30 474/158 |
| 2015/0362057 A1 | 12/2015 | Wesling et al. |
| 2016/0114859 A1 | 4/2016 | Tsai et al. |
| 2016/0272279 A1* | 9/2016 | Yoshida ............. B62M 9/12 |
| 2017/0029066 A1* | 2/2017 | Fukunaga .......... F16H 55/303 |
| 2017/0146109 A1* | 5/2017 | Reiter ............... F16H 55/08 |
| 2017/0174288 A1* | 6/2017 | Wu .................. B62M 9/105 |
| 2017/0183060 A1* | 6/2017 | Braedt .............. F16H 55/30 |
| 2017/0234418 A1* | 8/2017 | Barefoot ............ B62M 9/00 474/156 |
| 2017/0247081 A1* | 8/2017 | Sugimoto ........... B62M 9/10 |
| 2017/0274960 A1* | 9/2017 | Dubois .............. F16D 1/108 |
| 2017/0292598 A1* | 10/2017 | Moore ............... B62M 9/105 |
| 2018/0037296 A1* | 2/2018 | Hamamoto ......... F16F 15/1245 |
| 2018/0043203 A1* | 2/2018 | Seol ................. A63B 21/157 |
| 2018/0057106 A1* | 3/2018 | Iwai ................. B62M 3/00 |
| 2018/0079467 A1* | 3/2018 | Hirose .............. F16H 55/30 |
| 2018/0127057 A1* | 5/2018 | Sugimoto .......... B62M 9/105 |
| 2018/0134340 A1 | 5/2018 | Emura |
| 2018/0231060 A1* | 8/2018 | Milanesio ........... B62M 3/00 |
| 2018/0347680 A1 | 12/2018 | Akanishi |
| 2018/0362113 A1* | 12/2018 | Day ................. B62M 1/24 |
| 2019/0017586 A1* | 1/2019 | Sugimoto .......... B62M 9/105 |
| 2019/0085899 A1* | 3/2019 | Bernardele ......... F16C 19/54 |
| 2019/0152558 A1 | 5/2019 | Staples et al. |
| 2019/0185108 A1* | 6/2019 | Bush ................ F16H 55/12 |
| 2019/0210677 A1* | 7/2019 | O'Reilly ............. B62K 19/34 |
| 2020/0200253 A1 | 6/2020 | Klawer et al. |
| 2020/0256446 A1 | 8/2020 | Klawer et al. |
| 2021/0094652 A1 | 4/2021 | Staples et al. |
| 2023/0111794 A1 | 4/2023 | Lee et al. |

FOREIGN PATENT DOCUMENTS

| | | |
|---|---|---|
| CN | 200999089 Y | 1/2008 |
| CN | 101224782 A | 7/2008 |
| CN | 103133637 A | 6/2013 |
| CN | 107380340 A | 11/2017 |
| DE | 3130258 A1 | 6/1982 |
| DE | 3531030 A1 | 3/1987 |
| DE | 19751879 A1 | 5/1999 |
| DE | 19954432 A1 | 5/2001 |
| DE | 20218755 U1 | 2/2003 |
| DE | 102015005673 A1 | 11/2015 |
| DE | 202017107695 U1 | 3/2018 |
| EP | 0144984 B1 | 4/1989 |
| EP | 0538780 A1 | 4/1993 |
| EP | 1270393 A1 | 1/2003 |
| EP | 1281609 A2 | 2/2003 |
| EP | 1352825 A1 | 10/2003 |
| EP | 1426282 A2 | 6/2004 |
| EP | 1493654 A1 | 1/2005 |
| EP | 1619417 A2 | 1/2006 |
| EP | 1884460 A2 | 2/2008 |
| EP | 1884461 A2 | 2/2008 |

(56) References Cited

FOREIGN PATENT DOCUMENTS

| EP | 2423091 A1 | 2/2012 |
|---|---|---|
| ES | 2600778 A1 | 2/2017 |
| FR | 904975 A | 11/1945 |
| FR | 946276 A | 5/1949 |
| FR | 2501615 B1 | 4/1986 |
| GB | 2005363 B | 6/1982 |
| JP | H10181662 A | 7/1998 |
| JP | 2005053410 A | 3/2005 |
| TW | 200821216 A | 5/2008 |
| TW | 201530021 A | 8/2015 |
| WO | 2007147909 A1 | 12/2007 |
| WO | 2010136135 A1 | 12/2010 |

OTHER PUBLICATIONS

Chinese Second Action and Search Report, App No. 2020011439469.7, 16 Pages, Dated Mar. 8, 2022.
European Examination Report, European Patent Application No. 17166123.4, 10 Pages, Dated Mar. 18, 2020.
Google Translation of Decision of Rejection for TW Appl. No. 106112061, Feb. 26, 2018 (Year: 2018).
Google Translation of Rejection for TW Appl. No. 106112061, Jul. 30, 2018 (Year: 2018).
Inverted trapezoid—Google Search, Oct. 4, 2019, (Year: 2019).
Machine Translation of Chinese First Action and Search Report, Appl. No. 201710232829.8, Feb. 3, 2020 (Year: 2020).
European Search Report, European Patent Application No. 17166123.4, Oct. 5, 2017, 9 Pages.
Decision of Rejection for TW Application No. 106112061 pp. 8, Feb. 26, 2018.
Decision of Rejection for TW Application No. 106112061 pp. 10, Jul. 30, 2018.
Chinese Fourth Action and Search Report, App No. 2020011439469.7, 24 Pages, Dated Feb. 20, 2023.
Chinese Third Action and Search Report, App No. 2020011439469.7, 7 Pages, Dated Aug. 18, 2022.
Proximate definition, Dictionary.com, Sep. 28, 2022 (Year: 2022).
Tang, et al., "Guide for Designers of Plastic Articles", Sep. 30, 1993, p. 175.

* cited by examiner

CHAINRING

CROSS-REFERENCE TO RELATED APPLICATIONS

This application is a Continuation and claims priority to and benefit of co-pending U.S. patent application Ser. No. 16/708,061, filed on Dec. 9, 2019, entitled "CHAINRING" by Klawer et al., and assigned to the assignee of the present application, the disclosure of which is hereby incorporated by reference in its entirety.

The U.S. application Ser. No. 16/708,061 claims priority to and benefit of U.S. Provisional Patent Application No. 62/781,536 filed on Dec. 18, 2018, entitled "CHAINRING" by Klawer et al., and assigned to the assignee of the present application, the disclosure of which is hereby incorporated by reference in its entirety.

FIELD OF THE INVENTION

Embodiments of the invention generally relate to a chainring for a chain driven vehicle.

BACKGROUND

In a bicycle, such as a mountain bike, electric bike (eBike), or the like, that has a number of gears in a cassette in the rear, there can be a significant amount of cross-chaining. That is, the angle of the roller chain's approach to the chainring changes as different rear gears are selected. For example, as the roller chain moves to the peripheral gears on the rear cassette, there is an increase in the lateral angle at which the roller chain approaches the chainring. These different approach angles can deleteriously affect the ability of the traditional chainring to retain the roller chain thereby resulting in roller chain disengagement or other roller chain retention issues.

BRIEF DESCRIPTION OF THE DRAWINGS

Aspects of the present invention are illustrated by way of example, and not by way of limitation, in the accompanying drawings, wherein.

Figure 1:
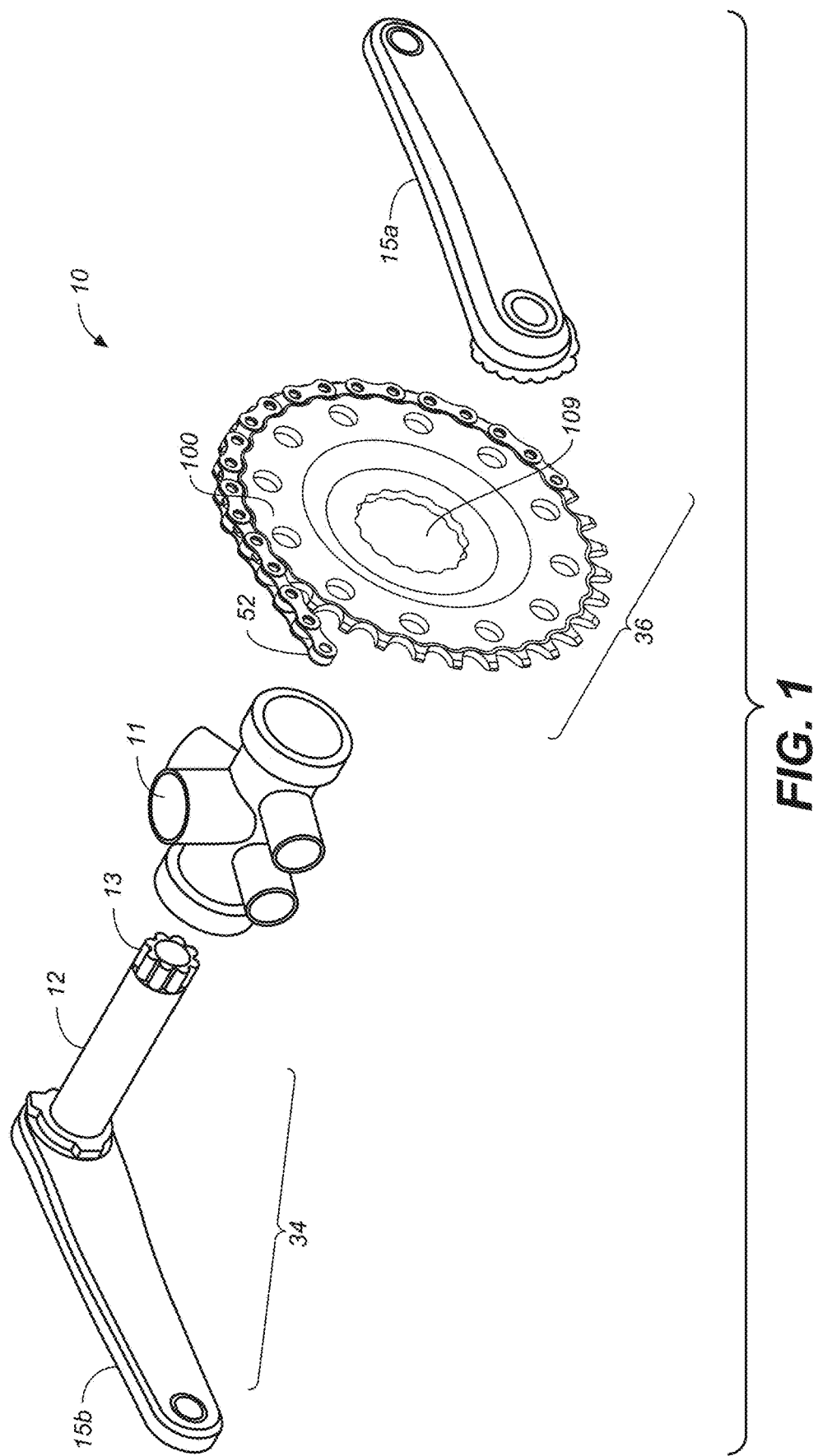
FIG. 1 is an exploded view of a crank assembly, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

A roller chain, as discussed herein, refers to a chain having alternating links of different width, e.g., an outer link coupled to an inner link, coupled to an outer link, and the pattern repeats for the duration of the chain. The outer link encompasses the inner link and as such the outer link has a wider central opening than the inner link. Similarly, the inner link has a narrower central opening than the outer link. The use of alternatingly inner and outer links provides numerous advantages, including allowing the same chain to be modified to different lengths by simply removing the pins between the links, adding or removing some links and then reinstalling the pin between the newly sized chain.

A chainring (sometimes called a chain ring, a sprocket, etc.), as discussed herein, is a toothed ring that is part of the crankset and used to transfer power provided via the rider through the pedals to the rear (or driving) wheel. The teeth on the chainring are designed and spaced to engage with the openings in the links of the roller chain.

Due to the alternating widths in the links of roller chains, many chainring designs utilize teeth of alternating sizes, e.g., a wider tooth for the outer link, followed by a narrow tooth for the inner link, etc. to coincide with the wider opening of the outer link and the narrow opening of the inner link of a typical bicycle roller chain. However, when the teeth of the chainring are varied in size the installation of the roller chain on the chainring will require proper clocking to make sure that the chainring teeth and roller chain links are correctly aligned. If they are not properly clocked, and the chainring teeth and roller chain links will be misaligned, deleteriously affected chain retention will result from mechanical interference disallowing the chainring teeth from meshing into the chain gaps. In some instances, the chainring teeth under driving loads may become lodged in the chain gap and may not release from the chain link gap and may not release from the chain link gap as required as the chainring rotates.

The disclosed chainring increases chain retention capabilities without having to clock the chainring teeth into the chain link gaps by engaging different parts of the roller chain link via the bevel. That is, the bevels of the chainring are designed to couple with bevels of the roller chain links in a manner that is able to provide improved roller chain retention as compared to prior chainring designs.

The chain links in this embodiment have bevel features that are very similar and couple to the chainring bevel, however the chainring bevel and/or the chain link bevel feature may vary in size and shape, and may differ from each other but still facilitate coupling of the chain with the chainring.

The chainring has chain retention features that align a roller chain by engaging roller chain links in a manner as described herein to keep the roller chain aligned on the chainring to reduce the opportunity for derailing of the roller chain.

In one embodiment, when the roller chain is engaging a mid-gear there is an alignment relationship, but at a lower or higher gear, the misalignment between the roller chain and the chainring can grow.

By having the same thickness of teeth on the chainring an advantage of reduced manufacturing costs is obtained when subtractive manufacturing methods such as machining are employed. However, in one embodiment, the beveling can be used on chainrings with differing tooth thicknesses, while still obtaining the alignment benefit.

FIG. 1 is an exploded view of a crank assembly 10, in accordance with an embodiment. Crank assembly 10 is shown in conjunction with bicycle frame portion 11 where the crank is mounted. Crank assembly 10 also includes a left-hand non-drive crank assembly 34 which includes a left-hand crank arm 15b and a spindle 12 that includes a spindle interface 13. Crank assembly 10 also includes a right-hand drive side crank assembly 36 which includes a right-hand drive side crank arm 15a with a chainring interface 17, a chainring 100 with opening 109, and a roller chain 52.

During assembly, chainring interface 17 will couple with opening 109 of chainring 100 to fixedly couple chainring 100 with right-hand drive side crank arm 15a thereby forming the right-hand drive side crank assembly 36. In one embodiment, after chainring 100 is coupled with right-hand drive side crank arm 15a, a lock ring is used to fixedly couple the chainring 100 onto right-hand drive side crank arm 15a.

Spindle 12 is inserted through bicycle frame portion 11 and spindle interface 13 couples with the interface on right-hand drive side crank assembly 36. In one embodiment, crank assembly 10 includes additional parts such as, pedals, pedal washers, preloader, dust caps, spindle spacers, bearings, hex nuts, preload adjusters, and the like. Those parts are not shown for purposes of clarity.

Figure 2:
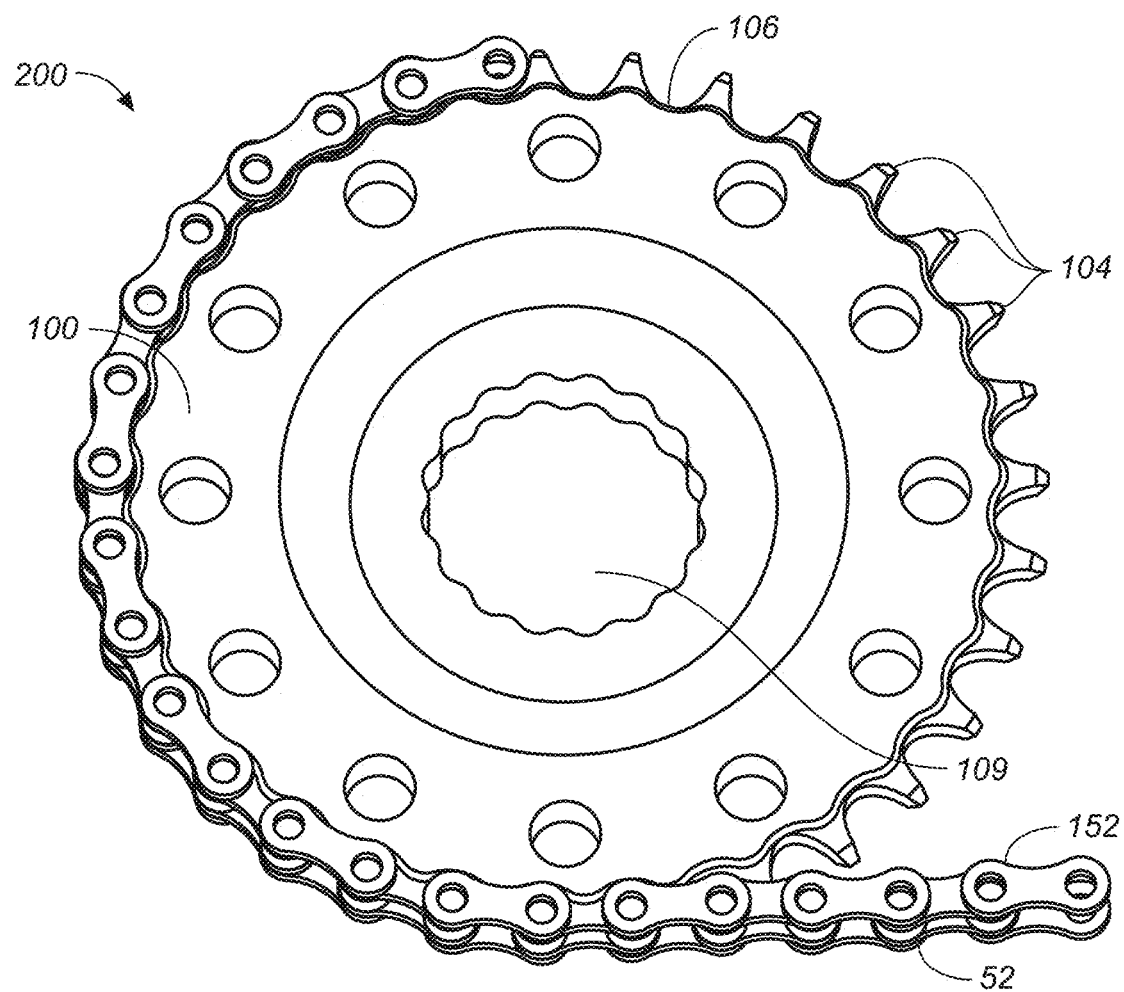
FIG. 2 is a diagram of the chainring, in accordance with an embodiment.

With reference now to FIG. 2, a diagram 200 of chainring 100 is shown in accordance with an embodiment. Diagram 200 includes a chainring 100 and roller chain 52. Chainring 100 includes a plurality of teeth 104 about an outer perimeter, a chainring bevel 106, and opening 109. In one embodiment, chainring bevel 106 begins at the root of teeth 104 and is radially beveled such that it widens toward the center of chainring 100 and narrows toward the teeth 104 (as shown in detail in FIGS. 4 and 5). Roller chain 52 includes roller chain bevel 152 at the outer perimeter of the roller chain links. In one embodiment, chainring bevel 106 is designed to correctly orient with roller chain bevel 152.

In one embodiment, chainring bevel 106 is found below the tooth root on both sides of chainring 100 across the entire circumference of chainring 100. In one embodiment, chainring bevel 106 is shaped like roller chain bevel 152 and is intended to contact roller chain bevel 152 to provide alignment between chainring 100 and roller chain 52. In one embodiment, chainring bevel 106 is shaped to mirror roller chain bevel 152 for the narrow links of roller chain 52. In another embodiment, chainring bevel 106 is shaped to mirror roller chain bevel 152 for the wide links of roller chain 52. By providing chainring bevel 106 that matches only one of the wider link bevel or the narrower link bevel, roller chain 52 can be mounted onto chainring 100 without a need for clocking. E.g., roller chain 52 can be placed on chainring 100 without concern as to whether roller chain 52 is at a wide or narrow link for a given tooth on chainring 100. In other words, in one embodiment, there is no pattern in chainring bevel 106 with respect to the different bevel characteristics of the wide and narrow links of the roller chain.

In another embodiment, chainring bevel 106 is patterned to address the variations between the roller chain bevel 152 for wide links and a different roller chain bevel 152 for narrow links of roller chain 52. In the patterned chainring bevel 106 embodiment, roller chain 52 would need to be mounted on chainring 100 with care to ensure the roller chain is properly clocked during instillation thereof.

In one embodiment, chainring 100 has 32 teeth. Although 32 teeth are shown in one embodiment, the technology is well suited to the use of various other numbers of teeth 104 such as 28, 30, 34, or the like.

In one embodiment, chainring 100 is comprised of a single material such as aluminum, titanium, steel, or the like. In one embodiment, chainring 100 is comprised of a composite material such as injection molded carbon fiber, carbon fiber with reinforced nylon, compression molding, composite layering, nylon reinforced with carbon fibers, chopped carbon fibers, a plastic, polymer, other long fiber-reinforced plastics, or the like. In one embodiment, chainring 100 could be formed from a combination of materials such as a single material for the teeth 104 and/or the portion of chainring 100 about opening 109, and an inner composite material for the remainder of the chainring. In one embodiment, the single material will have a higher modulus of elasticity than that of the composite.

Figure 3A:
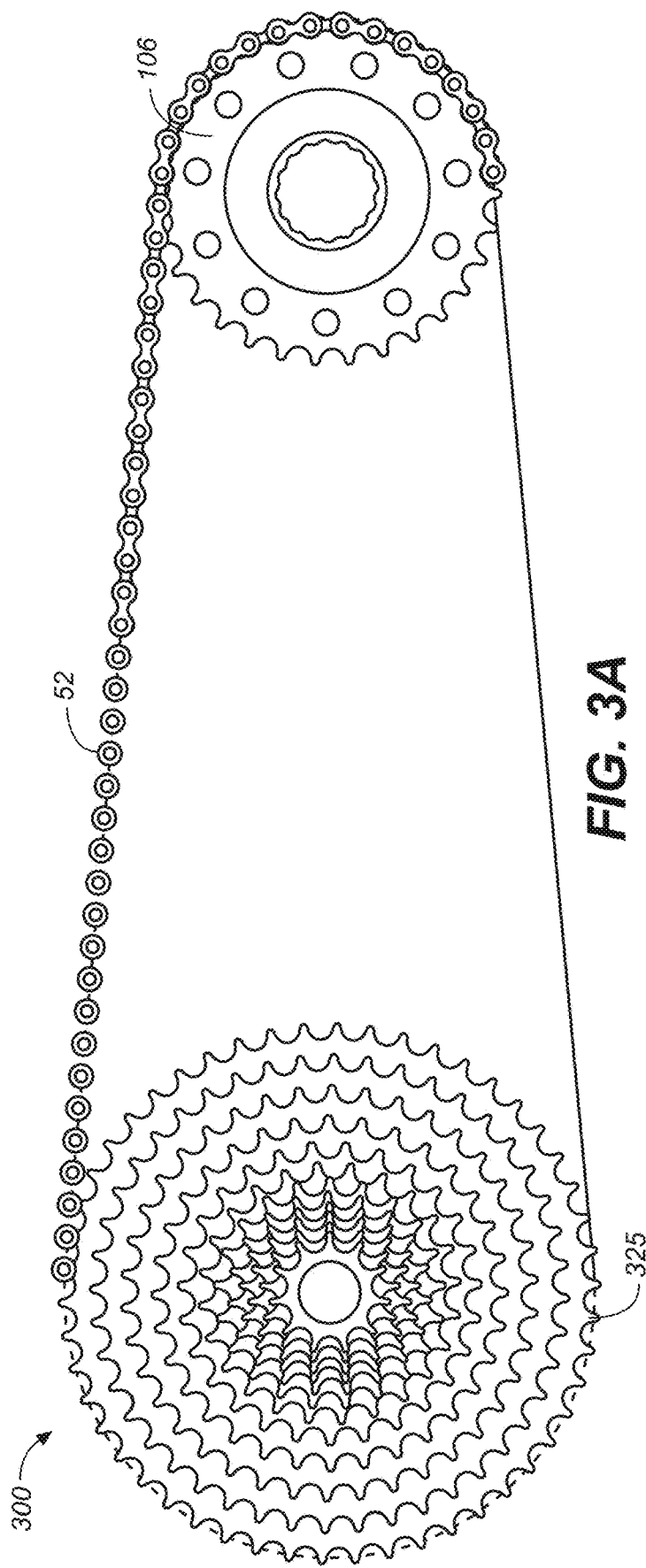
FIG. 3A is a side view of the relationship between the chainring and a rear cassette, in accordance with an embodiment.
Figure 3B:
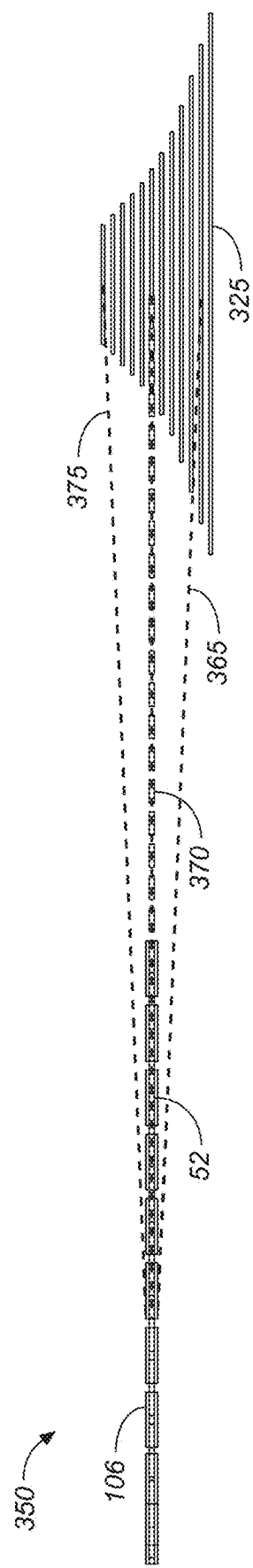
FIG. 3B is a top view of the relationship between the chainring and the rear cassette that illustrates cross-chaining therebetween, in accordance with an embodiment.

Referring now to FIG. 3A, a side view 300 of the relationship between chainring 100 and a rear cassette 325 is shown in accordance with an embodiment. FIG. 3B, a top view 350 of the relationship between chainring 100 and rear cassette 325 that illustrates cross-chaining therebetween is shown in accordance with an embodiment. The discussion of FIG. 3A is included within the discussion of FIG. 3B for purposes of clarity.

For example, in a bicycle, such as a mountain bike, road bike, or the like, that has a number of gears in a rear cassette 325, there can be a significant amount of cross-chaining. That is, when roller chain 52 moves to the outside gears on rear cassette 325, there is an increase in roller chain 52 misalignment between rear cassette 325 and chainring 100. For example, in top view 350 when roller chain 52 is in the middle of rear cassette 325 it is aligned with chainring 100 as shown by line 370. However, when roller chain 52 is toward the outer gear of rear cassette 325 it is no longer aligned with chainring 100 as shown by line 375. Similarly, when roller chain 52 is toward the inner gear of rear cassette 325 it is no longer aligned with chainring 100 as shown by line 365. Thus, the alignment between roller chain 52 and chainring 100 can vary in angle of attack and on either side of chainring 100.

In one embodiment, teeth 104 on chainring 100 also keep roller chain 52 centered and aligned such that misalignment is reduced when roller chain 52 is moved between the gears in the rear cassette, as teeth 104 are acting as alignment guides.

In addition to teeth 104, chainring bevel 106 provides additional contact area with roller chain 52 which further aids in retention of roller chain 52. Moreover, since teeth 104 are acting as guides, and chainring bevel 106 is providing additional alignment correction between chainring 100 and roller chain 52 as roller chain 52 is moved between the gears of rear cassette 325, teeth 104 can be narrower to provide a loose fit in even the wider gaps of roller chain 52.

In one embodiment, since chainring bevel 106 is interacting with roller chain bevel 152, the force transfers that teeth 104 of chainring 100 normally provide to roller chain 52 can now be further shared with chainring bevel 106. In other words, some of the force transfer will occur between chainring bevel 106 and roller chain bevel 152 instead of all of the force transfer occurring between teeth 104 and the roller chain links. In so doing, the life of roller chain 52 can be extended as wear to the gaps in the links of roller chain 52 is reduced.

Figure 4:
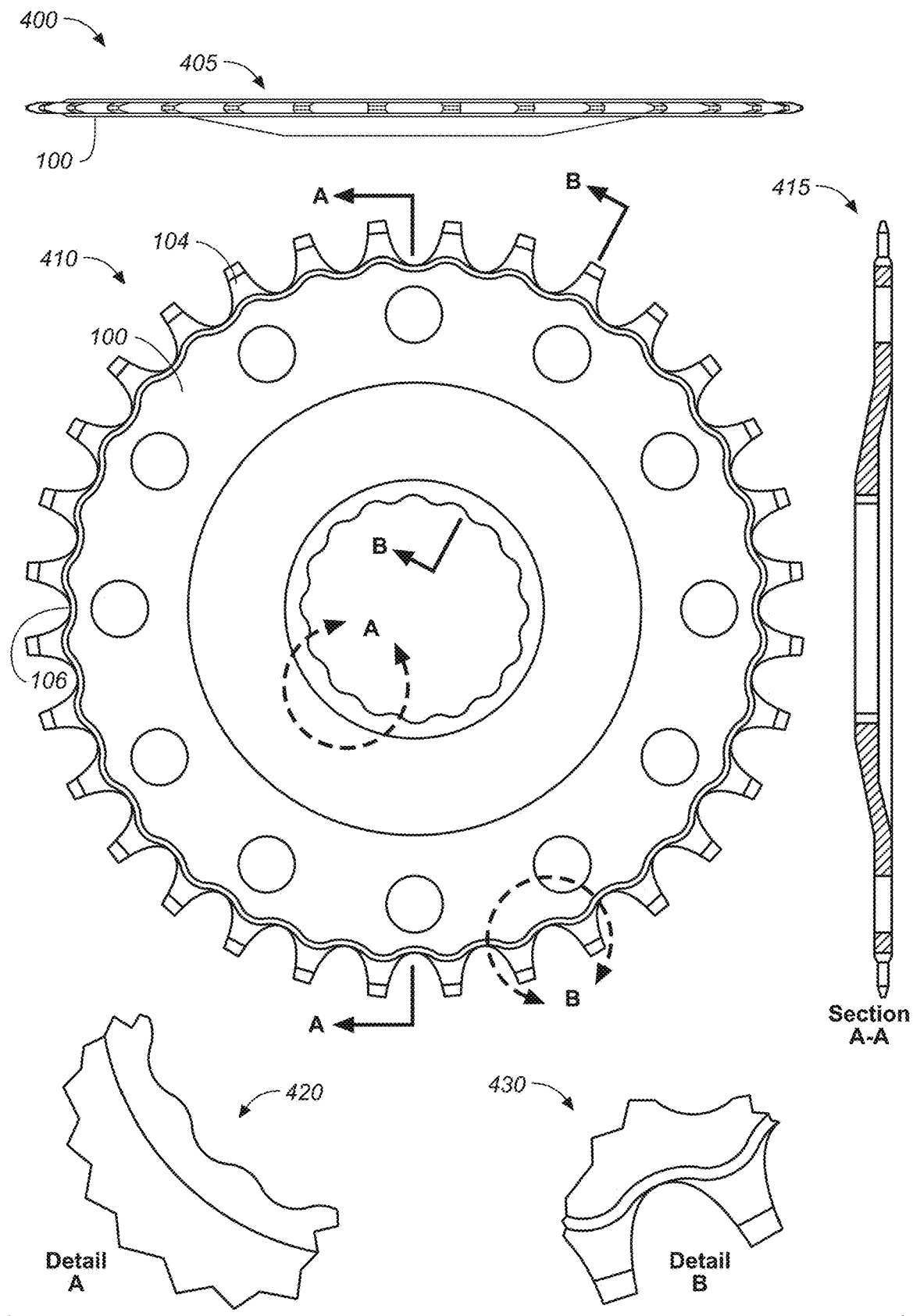
FIG. 4 is a structural diagram that includes a top view, side view, two expanded detail views and a sectional view of the chainring bevel, in accordance with an embodiment.

With reference now to FIG. 4, a structural diagram 400 that includes a top view 405, side view 410, two expanded detail views 420 and 430, and a sectional view 415 of chainring 100 is shown in accordance with one embodiment.

Within side view 410 a number of measurements are shown for chainring 100, teeth 104, and chainring bevel 106. Although a number of measurement are shown for chainring 100, it should be appreciated that the provided measurements are one embodiment and that chainring 100 measurements could be adjusted based on a given roller chain 52 design, for personal reasons, for performance reasons, for different applications (e.g., road, downhill, offroad, uphill, etc.), for different size bike frames, and the like.

Expanded detail view 420 is one embodiment of a view of the detail and measurements of the design of opening 109 which couples with chainring interface 17 (as shown in FIG. 1). Although a number of measurement are provided in view 420, it should be appreciated that the provided measurements are one embodiment and that one or more of the measurements could be adjusted and/or modified for personal reasons, for performance reasons, for different applications (e.g., road, downhill, offroad, uphill, etc.), for different size bike frames, different crank assemblies, different crank assembly designs, different chainring designs, and the like.

Expanded detail view 430 is one embodiment of a view of the detail and measurements of the design of teeth 104 and chainring bevel 106. Although a number of measurement are provided in view 430, it should be appreciated that the measurements are one embodiment and that one or more of the measurements could be adjusted or modified based on a given roller chain 52 design, for personal reasons, for performance reasons, for different applications (e.g., road, downhill, offroad, uphill, etc.), for different size bike frames, and the like.

Sectional view 415 is a sectional view of section A-A that includes a diameter measurement, a tooth measurement, and a maximum width measurement of chainring 100. Although a number of measurement are provided in section view 415, it should be appreciated that the provided measurements are one embodiment and that one or more of the measurements could be adjusted and/or modified for personal reasons, for performance reasons, for different applications (e.g., road, downhill, offroad, uphill, etc.), for different size bike frames, different crank assemblies, different crank assembly designs, different chainring designs, and the like.

Figure 5:
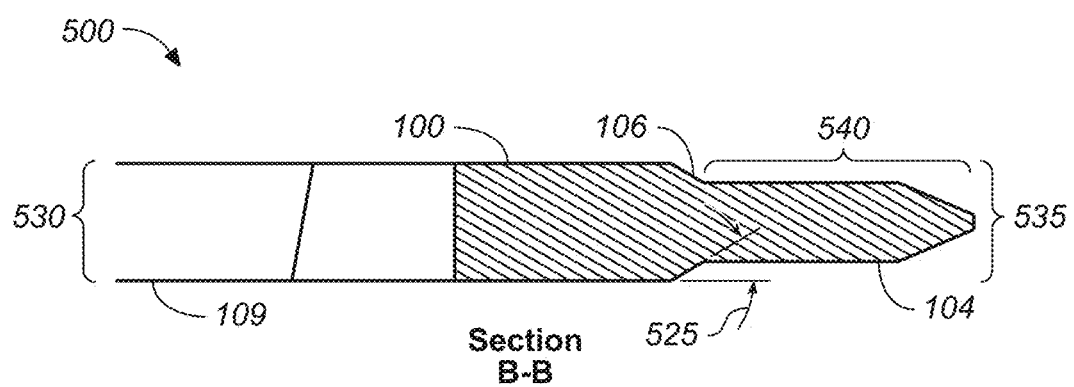
FIG. 5 is a section view of the chainring that includes chainring measurements, layout and the chainring bevel, in accordance with an embodiment.

With reference now to FIG. 5, a section view 500 which shows section B-B from chainring 100 of FIG. 4 is shown in accordance with one embodiment. In general, section view B-B of chainring 100 is shown to provide detail of the shape of chainring bevel 106 in accordance with an embodiment. As described herein, chainring bevel 106 is not referring to the changes in thickness and or thinness of chainring 100 from tip of teeth 104 to base of teeth 104 (as shown by measurement 540) but instead refers to the wave type beveling that travels circularly about chainring 100 at or about the root of teeth 104 of chainring 100 (as indicated by bevel angle 525).

In one embodiment, bevel angle 525 of chainring bevel 106 is a 30-degree angle from the root of teeth 104 (e.g., tooth width measurement 535) inward toward the center of chainring 100 (e.g., toward opening 109) until the width of chainring 100 (e.g., chainring width measurement 530) is obtained. Although a bevel angle 525 of 30 degrees is described, it should be appreciated that 30 degrees is one example of the bevel angle 525 and that bevel angle 525 could be modified based on a given roller chain 52 design, for personal reasons, for performance reasons, for different applications (e.g., road, downhill, offroad, uphill, etc.), and the like. For example, in one embodiment, if roller chain 52 is thicker or thinner, then bevel angle 525 would have different angular degrees accordingly. Similarly, although a measurement is shown for tooth width measurement 535 and chainring width measurement 530 is shown, it should be appreciated that the provided measurements are examples of the tooth width measurement 535 and chainring width measurement 530 and that tooth width measurement 535 and chainring width measurement 530 could be adjusted based on a given roller chain 52 design, for personal reasons, for performance reasons, for different applications (e.g., road, downhill, offroad, uphill, etc.), and the like.

In one embodiment, chainring bevel 106 and bevel angle 525 are sized for a specific roller chain 52 type such that different roller chain structures would result in different designs for chainring bevel 106. In one embodiment, chainring bevel 106 is a symmetrical design on both sides of chainring 100. In another embodiment, chainring bevel 106 is an asymmetrical design. For example, chainring bevel 106 could exist on only one side of chainring 100, chainring bevel 106 could have a first design (e.g., the roller chain bevel 152 of the narrow links of roller chain 52) on one side of chainring 100 and a second different design (e.g., the roller chain bevel 152 of the wide links of roller chain 52) on the other side of chainring 100.

Although a number of measurements are shown in sectional B-B, it should be appreciated that one or more of the measurements can be changed or modified dependent upon the design of roller chain 52, chainring 100, roller chain bevel 152, teeth 104, for personal reasons, for performance reasons, for different applications (e.g., road, downhill, offroad, uphill, etc.), for different size bike frames, different crank assemblies, different crank assembly designs, different chainring designs, and the like.

In one embodiment, the addition of chainring bevel 106 to chainring 100 will provide an additional benefit of the shedding of any mud or other debris that could be accumulating on chainring 100 and/or roller chain 52. For example, in a non-beveled chainring, while riding through mud or the like, the mud could pack itself into the gaps in the roller chain, the chainring, the teeth of the chainring, and the like thereby causing roller chain retention issues as the mud displaces the roller chain. In contrast, because the base of teeth 104 of chainring 100 are followed by chainring bevel 106, any collection of mud or other debris in the gaps in roller chain 52, chainring 100, teeth 104, or the like would be easily pushed down chainring bevel 106 by roller chain 52 as they interact. As such, the mud or other debris would be shed from chainring 100 resulting in better roller chain retention characteristics in a muddy, dirty, or debris filled environment. In one embodiment, additional features could be formed or machined into bevel 106 to provide grooves to facilitate further mud shedding.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A chainring comprising:
   a plurality of teeth about an outer perimeter of the chainring; and
   a chain retention feature at a root of one or more of the plurality of teeth and traversing at least a portion of a circumference of the chainring, and said chain retention feature beginning at the root of one or more of the plurality of teeth and being radially beveled, such that it is thicker toward a center of the chainring and thinner toward a tip of the plurality of teeth.

2. The chainring of claim 1, further comprising:
   said chain retention feature at the root of each of the plurality of teeth, the chain retention feature traversing an entire circumference of the chainring.

3. The chainring of claim 1, wherein said chain retention feature is a beveled chain retention feature.

4. The chainring of claim 1, wherein the chain retention feature is configured to align with at least a portion of a roller chain, said chain retention feature assisting in retention of said roller chain on said chainring, and wherein the roller chain comprises a plurality of narrower links interspersed between a plurality of wider links, and said chain retention feature is shaped to mirror the plurality of narrower links of the roller chain.

5. The chainring of claim 4, wherein the chain retention feature does not need to be clocked with respect to said roller chain as said chain retention feature only mirrors the shape of the plurality of narrower links of the roller chain.

6. The chainring of claim 4, wherein the roller chain comprises a plurality of narrower links interspersed between a plurality of wider links, and said chain retention feature is shaped to mirror the plurality of wider links of the roller chain.

7. The chainring of claim 1, further comprising:
   an opening in a center of said chainring, the opening for fixedly coupling said chainring with a crank arm to form a drive side of a crank assembly.

8. The chainring of claim 1, wherein the chainring comprises a single material selected from the group consisting of: aluminum, titanium, composite, and steel.

9. The chainring of claim 1, wherein the chainring comprises a combination of material selected from the group consisting of: aluminum, titanium, composite, and steel.

* * * * *